Figure 1:
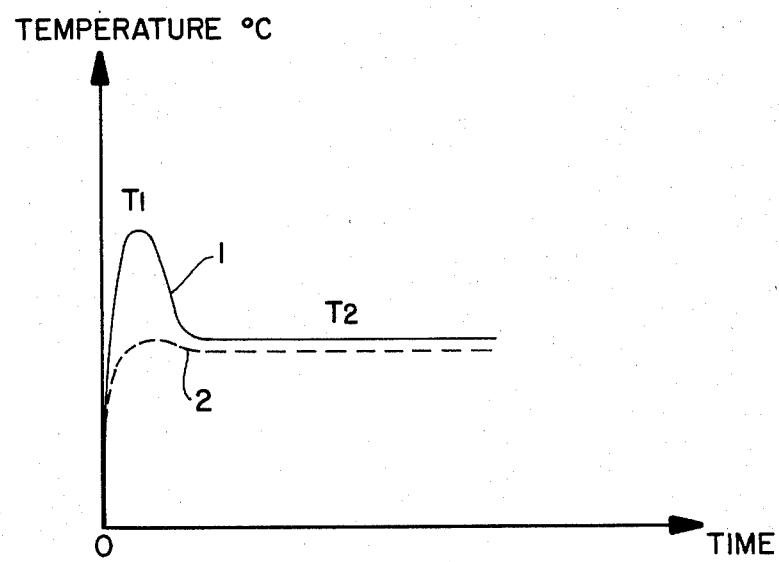

United States Patent [19]

Eudier et al.

[11] Patent Number: 4,608,085

[45] Date of Patent: Aug. 26, 1986

[54] SELF-LUBRICATING SINTERED BEARING AND PROCESS FOR THE PRODUCTION THEREOF

[75] Inventors: Michel Eudier, Paris; Hassan Youssef, Taverny, both of France

[73] Assignee: Alliages Frittes Metafram, Courbevoie, France

[21] Appl. No.: 675,694

[22] Filed: Nov. 28, 1984

[30] Foreign Application Priority Data

Nov. 29, 1983 [FR] France .................. 83 19433

[51] Int. Cl.$^4$ ............................................ C22C 9/02
[52] U.S. Cl. ...................... 75/247; 420/470; 252/26; 384/912
[58] Field of Search .............. 419/2, 37, 38, 57, 27, 419/28; 75/230, 247; 420/470; 252/26; 384/912

[56] References Cited

U.S. PATENT DOCUMENTS

| | | | |
|---|---|---|---|
| 3,461,069 | 8/1969 | Waldhüter | 75/230 |
| 3,795,493 | 3/1974 | Mertl | 75/247 |
| 4,072,513 | 2/1978 | Shapiro et al. | 420/474 |
| 4,307,998 | 12/1981 | Nakayama et al. | 420/474 |
| 4,334,926 | 6/1982 | Futamura et al. | 75/230 |
| 4,340,649 | 8/1982 | Nara et al. | 420/530 |

FOREIGN PATENT DOCUMENTS 3308 of 1881 United Kingdom ............... 420/470

Primary Examiner—John F. Terapane
Assistant Examiner—Anne Brookes
Attorney, Agent, or Firm—Dennison, Meserole, Pollack & Scheiner

[57] ABSTRACT

The invention concerns a self-lubricating sintered bearing of antimony bronze, and method for its production, the bearing containing dispersed phases (3, 4, 5) which are harder than the matrix (11), of the following composition (% by weight):

Sb 1.5 to 4%
Sn 5 to 10% with Sn/Sb=1.3 to 3.5
Cu+other elements and impurities: balance, and that its dispersed phases each consist of a diffusion halo (9, 10) in a condition of continuity with the matrix (11), said halo (9, 10) surrounding a microporosity (6, 7, 8) and being of a ternary intermetallic composition (Cu, Sn, Sb).

The invention also concerns the process for the production of the self-lubricating sintered bronze bearings.

2 Claims, 3 Drawing Figures

SELF-LUBRICATING SINTERED BEARING AND PROCESS FOR THE PRODUCTION THEREOF

The present invention is concerned with the art of bearings or floating rings which are used in plain bearing assemblies for components which are in relative movement with respect to said bearing assemblies and more particularly self-lubricating bearings.

The relative merits of porous oil-impregnated bearing members or rotary bearings which are produced by sintering are described in the summarizing article by G. C. PRATT "A review of sintered metal bearings: their production, properties, and performances" (POWDER METALLURGY, 1969, vol. 12, No. 24, pages 356–385). The performances of that type of bearing are limited by the way in which the film of oil is formed when the bearing is started up in operation thereof, the oil being re-absorbed by the bearing whenever the assembly comes to a halt and each start-up operation then giving rise to the danger of seizing, due to the metal contact between the shaft and the bearing until the oil film has formed. According to the above-quoted article, permeability of the wall of the bearing member or rotary bearing has a certain amount of influence and a low level of permeability corresponding to fine porosity would be better.

Apart from the above-mentioned danger of bearing seizure when starting up, if a shaft rotates for a prolonged period of time within a bearing and if the load that it carries and therefore the pressure that it applies to the bearing are increased, the film of oil tends to suffer from a breakdown due to its being heated and due to the pressure carried, and seizure occurs.

In this case, the admissible load depends on a number of parameters and primarily the relative speed as between the shaft and the bearing, and the nature of the oil. By applying an approximate experimental law, bearings are usually characterized by the maximum value of the product PV of the specific pressure P by the relative linear speed V of the surface of the shaft, the specific pressure P being the quotient of the total load F applied, by the diameter d of the shaft and the length l of the bearing. When the limit value of the product PV which is characteristic of a given bearing is exceeded, it is found that the temperature of the oil rises rapidly, the oil suffers deterioration, and more or less violent seizure occurs.

The article by G. C. PRATT points out on page 380 that, for porous oil-impregnated metal bearings, a maximum theoretical capacity PV of 50,000 lbf/in$^2$×ft/min (1.85 MPa×m/s) is often indicated, and that in practice it is possible to obtain an operating life of only 500 hours at the level of PV=20,000 lbf/in$^2$×ft/min (0.74 MPa×m/s).

DE-C-445 169 which was published in 1927 describes the production of sintered anti-friction bearings which are for example of the following composition: Cu 77%, Sn 4.5%, SnSb compound 13.5% (Sn and Sb being present therein in substantially equal amounts) and graphite 5%. The intermetallic compound SnSb may be replaced by Cu$_3$Sn or Cu$_3$Sb. The performances of the bearings produced are not specified and those bearings do not appear to have given rise to industrial developments. Disregarding the graphite which performs a separate function, it seems, as the tests hereinafter described will show, that the specified composition could not result in sintered bearings having a substantially improved value of PV by virtue of the excessively high content of Sb and possibly the way in which it was introduced.

The invention seeks to produce self-lubricating sintered bearings of bronze with antimony, with a substantially improved product PV.

STATEMENT OF THE INVENTION

The present invention concerns a self-lubricating sintered bearing comprising a porous oil-impregnated metal matrix, the matrix of which contains a plurality of dispersed phases each comprising a diffusion halo in a condition of continuity with the matrix. The above-mentioned halos have the particularity of being much harder than the matrix, they are of a ternary intermetallic composition (Cu, Sn, Sb), and they each surround a microporosity. Typically, at least 80% of the dispersed phases thus each consisting of a diffusion halo are of a diameter or a thickness of from 3 to 20 $\mu$m; and the microhardness $H_{V10g}$ of each diffusion halo exceeds 200 points.

The self-lubricating sintered bearing of the invention is of antimony bronze and is of the following overall composition, in percent by weight:
Sb 1.5 to 4%
Sn 5 to 10% with Sn/Sb=1.3 to 3.5
Cu+other elements and impurities: balance.

The other elements if present may comprise additions of Ni, Pb and/or Bi and/or Zn, as is known, the optional addition of Pb+Bi being limited to 5% and the addition of Zn also being limited to 5%.

As will be seen hereinafter in relation to the production process and in the examples, the particular structure and performances of the bearings of the invention appear to be linked to the Sn/Sb ratio which governs the possibility of forming the dispersed phases having the specified characteristics and, when that ratio is favourable, to a sufficient number of such dispersed phases, depending on the levels of the contents of Sn and Sb and the mode of introducing Sb.

The bearing of the invention has a "PV max" of between 3 and more than 6 MPa×m/s, whereas the known self-lubricating bronze bearings have a "PV max" of the order of from 2 to 2.5 MPa×m/s, and the temperature peak of the bearing on starting up is greatly attenuated or eliminated. By means of studies in respect of structures and composition and micrographic observations, the applicants have arrived at an explanation for the structure observed and for the surprising improvement in the behaviour of the bearings which has been found in that respect. The dispersed phases comprising a diffusion halo which is harder than the matrix result from sintering of an assembly of powders, the composition of which is capable of locally providing by diffusion compositions which are intermediate between that of an intermetallic compound (compound corresponding to a relative maximum in respect of the solidus), and that of a eutectic compound. The diffusion halos observed on a section of the rough bearing as produced by the sintering operation contain crystals or phases separate at high magnification, symptomatic of such compositions.

In that condition, they are much harder than the matrix, and in the case of a bearing of test No 3, $H_{V10g}$ was found to be 300 to 600 for the diffusion halos while $H_{V10g}$ was found to be 60 to 70 for the bronze matrix. When the bearing is run in, it is probable that, at locations and in a fairly well distributed fashion, certain hard halos occur at the surface and stand out slightly with respect to the surface of the run-in matrix. When the bearing is then used, the metal contacts between the shaft and the bearing, upon start-up of the movement therebetween, are without doubt restricted to the above-mentioned very small areas of hard halos at the surface of the bearing, which causes those hard halo portions to be very rapidly increased in temperature until local melting thereof occurs, the melting effect then causing the friction virtually to disappear, and immediate solidification of the melted and deformed halo portions. It seems possible and even probable that in that case the portions of diffusion halos of local compositions which are intermediate between the composition of an intermetallic compound and the composition of a eutectic compound, which are at the surface of the run-in bore of the bearing or which are slightly projecting with respect to the surface of the bore of the bearing undergo pasty melting and consequently retain an amorphous structure or a "metal glass" structure, localized heating thereof on each occasion being followed by very rapid cooling due to the disappearance of friction and the heat pumping effect produced by the mass of the bearing. Thus, that would probably then involve hard punctiform contact portions which soften as soon as the first frictional phenomena occur, so that friction is immediately reduced or eliminated.

The intermetallic compound which appears to be involved in the formation of the diffusion halos of the bronze bearing according to the invention is essentially: $Cu_{12}Sn_7Sb_3$ (approximate composition by weight: Cu 39%, Sn 42%, Sb 19%).

Similar results which however are a little less favourable were achieved when using compositions of Cu—Sn—Ni, the intermetallic compounds then involved being $Ni_3Sn$.

It may be noticed that the bearing of the invention is substantially distinguished from the bearings of the prior art. In particular, in the bearing of the invention, the hard dispersed phases, some of which are at the surface of the bore in the bearing or which project slightly after the running-in phase, which undoubtedly give rise to local frictional effects followed by pasty fusion effects which eliminate the friction concerned, play a part which is greatly different from that played by the hard intermetallic compounds disclosed in DE-C-445 169. Moreover, the assumed "in situ" creation of very small portions of amorphous alloy in a slightly projecting condition, which occurs when the bearings of the invention are put to use, appears as a consequence of the structure of the bearings of the invention and a probable explanation of the surprising results thereof. If that explanatory hypothesis is verified, that then involves an entirely novel use of the properties of amorphous alloys in which dispersed phases which are capable of giving amorphous alloys by fusion and rapid cooling are thus in a position of being transformed at the bore of a bearing by virtue of their hardness in the rough state as sintered. For a given overall composition, that type of structure is obtained here by powder metallurgy, and it may be noted that it would not be possible to produce this structure by melting and casting since melting and casting followed by fairly rapid cooling as is conventional practice, gives alloys which are virtually homogenous at ordinary temperature.

The invention also concerns the process for the production of the self-lubricating bearing or bearings which have just been defined above. The process of the invention differs from the known processes by virtue of the choice of the overall composition of the mixed powders and by virtue of the selection of sintering conditions, making it possible to attain the above-described qualities.

The production process of the invention provides for intimately mixing at least two metal powders of different analyses and possibly a compression lubricant, the weight of which is not taken into account in the calculations in respect of overall composition, compressing said powders in the form of blanks, possibly heating the compressed blanks at a temperature of less than 400° C. to remove the compression lubricant, subjecting the blanks to a heat treatment in a reducing atmosphere to produce the sintering effect, cooling the sintered components, calibrating the components by compression in a calibration tool, and impregnating the bearings produced with oil, using the methods which are known to the man skilled in the art. In the process of the invention, the overall composition in respect of powders selected, in percent by weight, is as follows:

Sb 1.5 to 4%

Sn 5 to 10% with Sn/Sb = 1.3 to 3.5

Cu + other elements and impurities: balance and the sintering heat treatment in a reducing atmosphere is carried out at from 680° to 840° C., with the temperature being held for from 5 to 120 min, and preferably at from 740° to 820° C., with the temperature being held for from 5 to 45 min.

The optional additives Pb, B, Zn are known in regard to tin bronzes and tin + nickel bronzes, for example to enhance suitability for turning or screw-cutting. Such additives may be used in the case of the bearings or rings according to the present invention.

In order to promote the formation of the phases comprising a diffusion halo in which the intermetallic compound $Cu_{12}Sn_7Sb_3$ seems to participate, and dispersion of such phases in the matrix, the powders of Sn or alloys and Sb used are preferably fine, with a granulometry of less than 0.06 mm, that is to say for example in the form of powders which pass a 230 ASTM sieve or finer.

TESTS AND COMMENTS

The invention will be better appreciated from the tests which will be described hereinafter, the table which sets out the main results and the figures or drawings which illustrate same.

Figure 2:
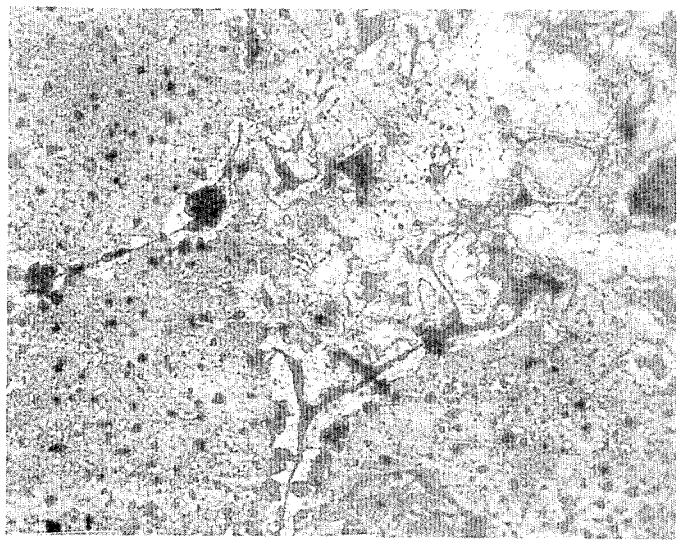
Figure 3:
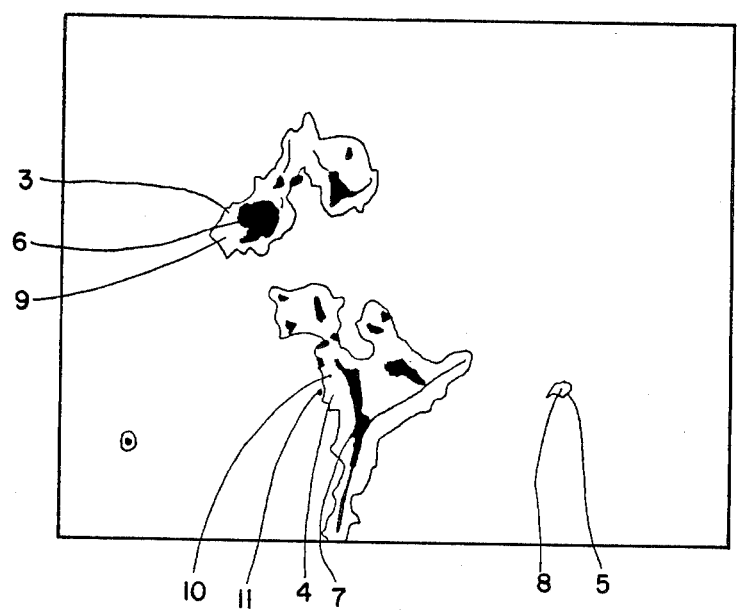

FIG. 1 shows the variation in the temperature of a conventional bearing and a bearing according to the invention, from start-up thereof, FIG. 2 shows a radial micrographic section (M=690) of a bearing according to the invention (test No 3 bis), reproduced by photocopying, and FIG. 3 shows in diagrammatic form certain characteristic details of the structure of the bearing according to the invention, on the micrographic section of FIG. 2.

TEST NO 1

The following were mixed, to produce the alloy "1" of overall composition in percent by weight of Cu 90%-Sn 10%:

50% of bronze powder containing 10% of tin (Cu-Sn 10%), which passes a 100 ASTM sieve (mesh opening 0.149 mm)

45% of copper powder which passes the same sieve

5% of tin powder which passes a 350 ASTM sieve (opening 0.04 mm), and in addition, as is conventional practice, 0.7% of zinc stearate powder which is added as a compression lubricant.

The batch of mixed powders was compressed in the form of bearing or ring blanks, under a pressure of 150 MPa, which gave a density of the order of 6.3 g/cm$^3$ in the compressed blanks.

The compressed components produced were first heated for about 20 minutes at a temperature of 350° C. to remove the compression lubricant. The addition of a compression lubricant and/or this preliminary heating operation are generally optional in nature.

The compressed components were then heated at a temperature of 780° C. for a period of 15 minutes in a hydrogen and nitrogen atmosphere produced by decomposition of ammonia, followed by cooling without particular precautions.

The components produced were then re-compressed in a calibration tool as is conventional practice in the production of self-lubricating bronze bearings. The bearings or rings were then impregnated with mineral oil having a viscosity of 100 centistokes at 40° C. That thus produced a plurality of self-lubricating bearings of unitary dimensions: an internal diameter of 25 mm × external diameter of 32 mm × length of 120 mm.

Those bearings were tested by means of an apparatus comprising a shaft made of steel, of a hardness $H_{Rc}$50 and a diameter d of 25 mm, giving an operational diametral clearance of 35 μm between the shaft and each bearing. That apparatus provided for two speeds of rotation, namely 1500 and 3000 rpm, corresponding to two relative linear speeds V at the location of the surfaces of the shaft and the bearing: 2 and 5 m/s. The applied load could vary from 15 to 100 daN, giving a possible variation in the specific pressure of from 0.3 MPa to 2 MPa, and a possible variation in the product PV of from 0.6 MPa×m/s to 8 MPa×m/s.

The apparatus is fitted with a means for measuring the temperature of the outside surface of the bearing in the course of testing by means of a contact thermocouple. Each bearing is subjected to the same sequence of successive tests, beginning with the lowest speed (2 m/s) with increasing successive loads corresponding to successive specific pressures of 0.3–0.6–0.9–1.2–1.5–1.8 and 2 MPa, and possibly continuing with the higher speed (4 m/s) and the same successive loads and specific pressures. In each test, measurements were taken (see FIG. 1) of the temperature $T_1$ of the bearing after starting up (O), the conventional bearings (curve 1) at that time giving a more or less pronounced temperature peak as long as the hydrodynamic film of oil has not been formed, and measurements were taken in respect of the equilibrium temperature $T_2$ which was then attained, the duration of the test being at least 30 minutes. The series of tests was stopped at the level "PV max" which gives rise to a temperature of 90° C., that level often being pegged by interpolation between a value of PV which is still satisfactory and the immediately higher value of PV which results in a more substantial rise in temperature and seizure. The "PV max" values of the bearings of the same test are close together, as well as the temperatures $T_1$ and $T_2$ which are characteristic of the behaviour of the bearing on start-up at a level of PV which is still satisfactory, and it is the mean values of PV max and $T_1$ (°C.)/$T_2$ (°C.) which are entered in Table 1 which sets out the results.

Test No 1 involved testing three bearings, and a mean "PV max" value of 2.5 MPa×m/s and a heating ratio $T_1/T_2$ of 1.5 were noted. Test No 1 which relates to a conventional bronze bearing serves as a reference.

TEST NO 2

The following were mixed to produce alloy "2", with an overall composition of Cu 92%-Sn 6%-Sb 2%:

30% of bronze powder with 10% tin, which passes through a 100 ASTM sieve (mesh opening of 0.149 mm)

65% of copper powder which passes through the same sieve

3% of tin powder and 2% of antimony powder, both of which powders pass through a 350 ASTM sieve (0.04 mm)

The same production process as that used in test No 1 was employed, and the bearings produced were tested in the above-described manner. Thus, three bearings were tested, and the results which are set out in Table 1 are a mean "PV max" of 5 MPa×m/s, which is surprising, and a mean $T_1/T_2$ ratio of only 1.3, showing a lesser degree of heating upon start-up.

The proportion of intermetallic compound $Cu_{12}Sn_7Sb_3$ (Cu 39%-Sn 42%-Sb 19%) of which the overall composition is theoretically capable was calculated. It is regulated here by the amount of antimony Sb=2%, Sn/Sb=3 being a little higher than the quotient Sn/Sb which is close to 2.3 in the intermetallic compound. That proportion is close to 10%.

TEST NO 3

The following were mixed to produce alloy "3" of overall composition of Cu 92%-Sn 5%-Sb 3%:

92% of copper powder which passes through a 100 ASTM sieve (mesh opening of 0.149 mm)

8% of Sn 62.5%-Sb 37.5% alloy powder, produced by mechanical crushing of the cast alloy, giving particles which are of smaller dimensions than about 10 μm.

The same production process as described above was used, and five bearings were tested. The results are a mean "PV max" of 6 MPa×m/s and a $T_1/T_2$ ratio of close to 1, that is to say, no overall increase in temperature of the bearing on start-up (curve 2 in FIG. 1).

TEST NO 3 BIS

The following were mixed to produce alloy "3 bis" of the same overall composition as alloy "3":

33% of bronze powder with 10% tin, which passes through a 100 ASTM sieve (0.149 mm)

62% of copper powder which passes through the same sieve

2% of tin powder and 3% of antimony powder, both of which powders pass through a 350 ASTM sieve (0.04 mm).

The same production process as described above was used, and five bearings were tested. The results are the same as for Test No 3.

In tests Nos 3 and 3 bis, the Sn/Sb ratio is 1.67 and the proportion of intermetallic compound $Cu_{12}Sn_7Sb_3$ of which the overall composition is theoretically capable is regulated by the amount of tin and is approximately 5/0.42=12%.

That proportion which is a little larger than in test No 2 is perhaps an indication which partly explains the improved results obtained.

A radial micrographic section (M=690) of one of the bearings of test "3 bis" is reproduced in FIG. 2. It will be seen therein, as will also be noted from the diagrammatic view illustrated in FIG. 3, that the structure is an agglomerate of grains which are more or less united, containing phases 3, 4 or 5 of various forms, occasionally having in this section a central cavity 6, 7 or 8, with a plurality of the phases being bounded by clearer halos.

Micrographic observation makes it possible to state that what is involved here are diffusion halos as at 9 and 10, in a condition of continuity with the matrix 11, that the clear halos 9 or 10 contain small crystals at locations therein, and local microhardness measurements show that the halos are very hard: $H_{V10g}$ of from 300 to 600, in comparison with $H_{V10g}$ of from 60 to 70 for the matrix. It is possible that the central cavities or microporosities as at 6 or 7 which are surrounded by halos 9 or 10 correspond to fusion of the antimony, which occurred at about 630° C., the tin having already melted and being entirely diffused at that time. Thus, the improvement in the performance of the bearings should be attributed to the presence of the dispersed phases comprising diffusion halos, of which at least 70% are of a diameter or a thickness of from 2 to 20 μm, with a spacing of from 20 to 100 μm.

TEST NO 4

The following were mixed to produce alloy "4" with an overall composition of Cu 92%-Sn 3%-Sb 5%:

30% of bronze powder with 10% of tin, which passes through a 100 ASTM sieve (0.149 mm)

65% of copper powder which passes through the same sieve

5% of antimony powder which passes through a 350 ASTM sieve (0.04 mm).

The same production process as that described above was used and four bearings were tested. The results are: mean "PV max" of 2 MPa×m/s and mean $T_1/T_2$ of 1.7.

The poor results indicated above were related to the Sn/Sb ratio which is only 0.6, fusion or simultaneous diffusion of Sn and Sb having little opportunity to give phases containing the intermetallic compound $Cu_{12}Sn_7Sb_3$ in which Sn/Sb=2.3 although the calculated proportion of compound $Cu_{12}Sn_7Sb_3$ of which the overall composition is theoretically capable is 3/0.42=7%.

TEST NO 4 BIS

An alloy "4 bis" was prepared in a similar fashion to alloy "4", with an Sb content of 7% instead of 5%. The sintered bearings produced could not be used because they were too fragile.

TEST NO 5

The following were mixed to produce alloy "6" of an overall composition of Cu 87%-Sn 7%-Sb 3%-Ni 3%:

30% of bronze powder with 10% tin, which passes through a 300 ASTM sieve (mesh opening of 0.048 mm)

60% of copper powder which passes through a 100 ASTM sieve (0.149 mm)

2% of tin powder which passes through a 350 ASTM sieve (0.04 mm)

3% of antimony powder which passes through the same sieve

5% of Ni 60%-Sn 40% alloy powder which passes through the same sieve.

That alloy is substantially of the composition of the intermetallic compound $Ni_3Sn$.

The same production process as that used in the preceding tests was employed and two bearings were tested on the same apparatus and in accordance with the same method. The results are: mean "PV max" of 6.5 MPa and a $T_1/T_2$ ratio of close to 1.

The interpretation of this is as follows: the intermetallic compounds which may be involved are both $Cu_{12}Sn_7Sb_3$ and $Ni_3Sn$. The tin included in the alloy $Ni_3Sn$ essentially remains therein and gives theoretically 5% of intermetallic phase.

The tin which is also present in the initial composition, in the form of bronze containing 10% of tin, and in the form of tin powder, is involved with the antimony in the formation of the compound $Cu_{12}Sn_7Sb_3$, the proportion of Sn/Sb then being 5/3=1.67. The proportion of intermetallic compound $Cu_{12}Sn_7Sb_3$ is then regulated by Sn and the composition is theoretically capable of giving 5/0.42=12% of that intermetallic compound. The overall composition is thus theoretically capable of giving in total 12+5=17% of intermetallic phases of the two types mentioned.

This test compared with test "3 bis" shows that the further addition of Ni gives only a slight improvement in performance, which does not justify the increased cost thereof.

The present invention is applied in regard to its essential principle to other alloys than bronzes and in all its characteristics to bronze rings or bearings in which the inside diameters are usually between 2 mm, this then involving micro-bearings, and 150 mm.

TABLE 1

| Test No | Overall composition of the bearings (% by weight) | | | | Sn/Sb | Ni/Sn | Calculated % of intermetallic compound | | Mean results of the tests | |
|---|---|---|---|---|---|---|---|---|---|---|
| | Cu | Sn | Sb | Ni | | | $Cu_{12}Sn_7Sb_3$ | $Ni_3Sn$ | PV max (MPa × m/s) | $T_1/T_2$ (°C./°C.) |
| 1 | 90 | 10 | 0 | 0 | — | 0 | 0 | 0 | 2.5 | 1.5 |
| 2 | 92 | 6 | 2 | 0 | 3 | 0 | 10 | 0 | 5 | 1.3 |
| 3 | 92 | 5 | 3 | 0 | 1.67 | 0 | 12 | 0 | 6 | 1 |
| 3 bis | 92 | 5 | 3 | 0 | 1.67 | 0 | 12 | 0 | 6 | 1 |
| 4 | 92 | 3 | 5 | 0 | 0.6 | 0 | (7.2) | 0 | 2 | 1.7 |
| 5 | 87 | 7 | 3 | 3 | 1.67 | 1.5 | 12 | 5 | 6.5 | 1 |

We claim:

1. A self-lubricating sintered bearing of antimony bronze consisting essentially of Cu, 1.5 to 4% by weight Sb and 5 to 10% by weight Sn, the ratio of Sn/Sb being 1.3 to 3.5, said bearing having a structure comprising a matrix having a plurality of dispersed phases therein, said dispersed phases being harder than said matrix, and each comprising a diffused region containing a ternary Cu-Sn-Sb intermetallic composition, and surrounding a microporosity.

2. A sintered bearing according to claim 1, wherein said dispersed phases are of a hardness $H_{v10g}$ of greater than or equal to 200.

* * * * *